United States Patent [19]

Harnoy et al.

[11] Patent Number: 4,811,791
[45] Date of Patent: Mar. 14, 1989

[54] ENHANCED OIL RECOVERY

[76] Inventors: Gideon N. Harnoy, P.O. Box 6039, Ramat-Efal, Israel, 52960; Shimon Gatt, 60 Hechlutz Street, Jerusalem, Israel, 96269; Yechezkel Barenholtz, 18 Neve-Shanan, Jerusalem, Israel, 93707

[21] Appl. No.: 81,395

[22] Filed: Aug. 4, 1987

[51] Int. Cl.$^4$ .............................................. E21B 43/22
[52] U.S. Cl. ................................. 166/305.1; 166/274; 166/275; 252/8.554
[58] Field of Search ................... 166/305.1, 273, 274, 166/275, 303; 252/8.551, 8.554

[56] References Cited

U.S. PATENT DOCUMENTS 4,085,799 4/1978 Bousaid et al. ..................... 166/274
4,323,124 4/1982 Swan .................................. 166/303

Primary Examiner—Bruce M. Kisliuk
Attorney, Agent, or Firm—Sigalos, Levine & Montgomery

[57] ABSTRACT

A method of recovering a petroleum from an underground source thereof comprising injecting into said underground source a petroleum displacement agent comprising a fluid and a modified liposome, said liposome being present in an amount sufficient to lower the interfacial tension between said fluid and said petroleum to below about 10 millidynes and the displacement agent.

6 Claims, 3 Drawing Sheets

ENHANCED OIL RECOVERY

BACKGROUND OF THE INVENTION

Oil is found in subterranean formations or reservoirs in which it has accumulated, and recovery is initially accomplished by pumping or permitting the oil to flow to the surface of the earth through wells drilled into the oil-bearing stratum. Oil can be recovered from such producing zones only if certain conditions exist. There must be adequate permeability or interconnected flow channels through the pore network of the oil-bearing stratums or "pay zone" to permit the flow of fluids therethrough and recovery efficiency (RE).

In the primary oil recovery stage, the RE is influenced by the natural energy or drive mechanisms present, such as water drive, gas cap drive, gravity, drainage, liquid expansion, relative permeability of reservoir formation, and combinations thereof within the formation and this natural energy is utilized to recover petroleum. In this primary phase of oil recovery, the oil reservoir natural energy drives the oil through the pore network toward the producing wells. When the natural energy source is depleted or in the instance of those formations which do not originally contain sufficient natural energy to permit primary recovery operations, some form of supplemental or artificial drive energy must be added to the reservoir to continue RE. Supplemental recovery of enhanced recovery is frequently referred to as secondary recovery, although in fact it may be primary, secondary or tertiary in sequence of employment. Enhanced recovery usually encompasses waterflooding or gas injection with or without additives, and other processes involving fluid or energy injection whether for secondary or tertiary oil recovery such as the use of steam or heated water.

Secondary recovery is a term utilized to mean any enhanced recovery first undertaken in any particular underground formation. Usually it follows primary recovery but can be conducted concurrently therewith to expedite production. Waterflooding is the most common method of secondary recovery.

Tertiary recovery refers to any enhanced recovery undertaken following secondary recovery. Broadly, tertiary recovery encompasses such procedures as miscible displacement, thermal recovery, or chemical flooding.

All of these procedures have been and, as noted, are being utilized to try to recover as much oil as possible from any given formation, but none is completely satisfactory. Many are expensive procedures not only in terms of equipment to be able to enhance the recovery, but also in terms of the chemicals and techniques utilized.

Perhaps most importantly it has been found that in many cases the particular technique used is extremely limited in terms of type of oil reservoir in which the recovery technique can be utilized and that a broad procedure for universal use has not been found.

This is particularly true with respect to waterflooding; probably the most inexpensive and widely practiced enhanced recovery technique. Water does not displace oil with high efficiency since water and oil are immiscible and the interfacial tension between water and oil is quite high. Accordingly, waterflood has produced incremental oil recovery amounting to about 10 to 15% of the original oil in place (OOIP) in the reservoir. In efforts to increase the amount of oil displaced from the formation and bring it to the surface, efforts have been made to utilize certain chemicals, mostly surfactants, to decrease the interfacial tension (IFT) between the injection water and the reservoir oil in order to displace and trap the oil in the underground formation and bring it to the surface. Such technique is referred to as surfactant flooding.

However, problems have occurred with such chemicals either because they are not sufficiently active to adequately displace the oil or are costly. More importantly, their effectiveness is limited by the reservoir heterogeneity, various reservoir fluids, high salinity, high bivalent ion concentration, high temperature, and continuous changes in such conditions along the pore channels in the reservoir. The chemicals tend to be unstable in or to be decomposed by such conditions and they suffer chromatographic changes.

No satisfactory stable displacement material or technique has been found which is economic, effective in the presence of highly concentrated brine, high temperatures, and/or hardness of the reservoir water, or other reservoir conditions.

SUMMARY OF THE INVENTION

The present invention provides a process and composition for the enhanced recovery of oil from an underground source thereof, which process can be utilized with highly concentrated brines, high temperatures, high divalent conditions, and/or hard reservoir water.

Briefly, the present invention comprises a method for recovering petroleum from an underground source thereof comprising injecting into said underground source a displacement agent comprising a petroleum-displacing fluid and a modified liposome.

The present invention also comprises a displacement agent for recovery of petroleum from an underground source thereof comprising a petroleum-displacing fluid and a modified liposome.

DETAILED DESCRIPTION

Figure 1:
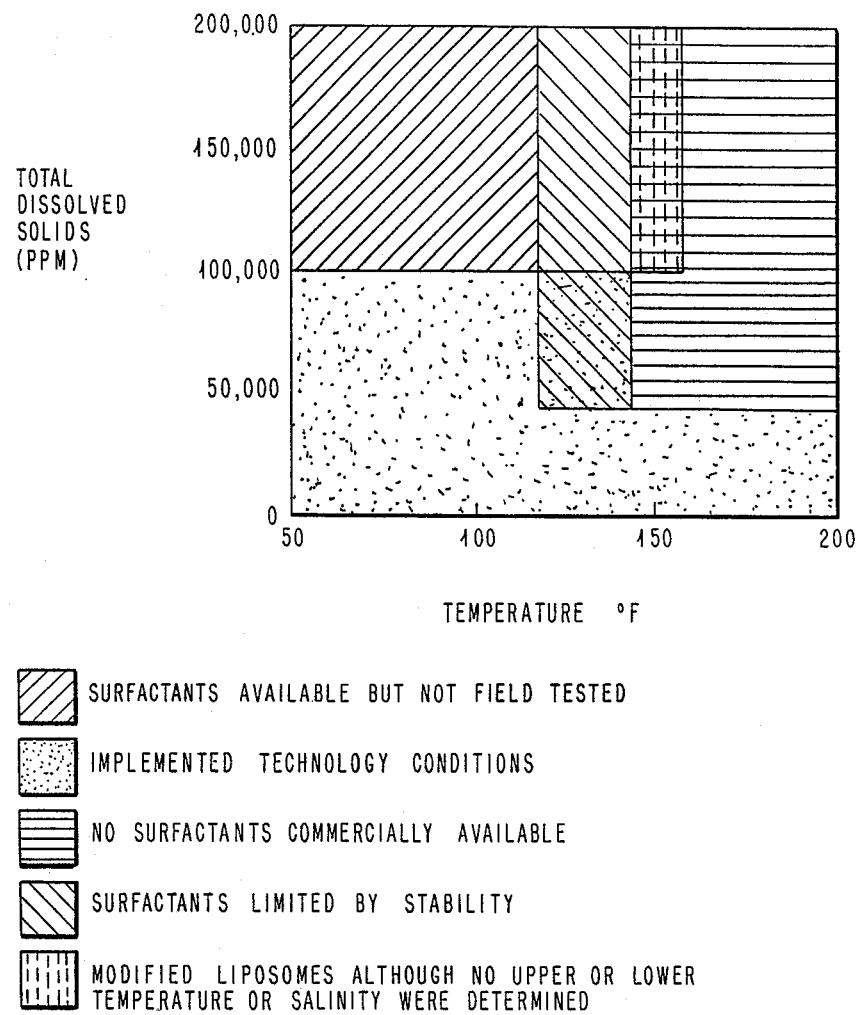
FIG. 1 is a chart showing presently available surfactants and their applicability as versus salinity and temperature as compared to the modified liposomes of the instant invention.

The essential and unique aspect of the present invention is the use of a modified liposome in an amount effective to enable enhanced oil recovery.

As used herein, the term "modified liposome" is intended to include all phospholipid spheres, or vesicles, in which at least one acyl group has been replaced by a complex phosphoric acid which have been modified; replaced by a complex phosphoric acid ester. The most common phospholipids and most suitable for the present invention are the α lecithins; also referred to as phosphatidylcholines (PC), which are mixtures of the diglycerides of stearic, palmitic, and oleic acids linked to the choline ester of phosphoric acid. The lecithins are found in all animals and plants such as eggs, soybeans, and animal tissues (brain, heart, and the like) and can also be produced synthetically. The source of the phospholipid or its method of synthesis are not critical, any naturally occurring or synthetic phosphatide can be used.

Examples of specific phosphatides are L-α-distearoyl) lecithin, L-α-(dipalmitoyl) lecithin, L-α-phosphatide acid, L-α-(dilauroyl)-phosphatidic acid, L-α(dimyristoyl) phosphatidic acid, L-α(dioleoyl)phosphatidic acid, DL-α(dipalmitoyl)phosphatidic acid, L-α(dipalmitoyl)-phosphatidic acid, L-α(distearoyl)phosphatidic acid, and the various types of L-α-phosphatidylcholines prepared from brain, liver, egg yolk, heart, soybean, and the like, or synthetically, and salts thereof. Other suitable modifications include the controlled peroxidation of the fatty acyl residue cross-linkers in the phosphatidylchlorines (PC) and the zwitterionic amphiphates which form micelles by themselves or when mixed with the PCs such as alkyl analogues of PC.

The phospholipids can vary in purity and can also be hydrogenated, fully or partially, but it is preferred to use the unhydrogenated phosphatides.

The liposomes can be "tailored" to the requirements of any specific reservoir, to maintain the stability in water and hydrocarbon, without aggregation or chromatographic separation, and remain well dispersed and suspended in the injected fluid and the fluid in situ and changes thereof in composition, as well as the temperature, salinity, bivalent ions, relative permeability in the reservoir while simultaneously reducing the interfacial tension between the oil and the brine to ultra-low values by increasing the capillary number. The liposome can be used with or without any other solvent or surfactant, without creating any ion exchange problems and without plugging the porous media in the producing zone.

Another important consideration in the selection of phospholipid is the acyl chain composition thereof. Currently, it is preferred that it have an acyl chain composition which is characteristic; at least with respect to transition temperature of the acyl chain components in egg or soybean PC; i.e., one chain saturated and one unsaturated or both being saturated. The possibility of using two saturated chains is not excluded.

The liposomes may contain other lipid components, as long as these do not induce instability and/or aggregation and/or chromatographic separation. This can be determined by routine experimentation.

A variety of methods for producing the modified liposomes which are unilamellar or multilamellar are known and available:
(i) A thin film of the phospholipid is hydrated with an aqueous medium followed by mechanical shaking and/or sonic irradiation and/or extrusion through a suitable filter;
(ii) Dissolution of the phospholipid in a suitable organic solvent, mixing with an aqueous medium followed by removal of the solvent; or
(iii) Use of gas above its critical point (i.e., freons and other gases such as $CO_2$ or mixtures of $CO_2$ and other gaseous hydrocarbons).

In general, they produce liposomes with heterogeneous sizes from about 0.02 to 10 microns or greater. Since (as will be discussed below) liposomes which are relatively small and well defined in size are preferred for use in the present invention, a second processing step defined as "liposome sizing" is for reducing the size and size heterogeneity of liposome suspensions.

The liposome suspension may be sized to achieve a selective size distribution of vesicles in a size range less than about 1 micron and preferably less than about 0.05–0.1 microns. Liposomes in this size range can readily be sterilized by filtration through a suitable filter. Smaller vesicles also show a lesser tendency to aggregate on storage, thus reducing potentially serious blockage or plugging problems when the modified liposome is injected to the porous oil-bearing stratum. Finally, liposomes which have been sized down to the submicron range show more uniform distribution.

Several techniques are available for reducing the sizes and size heterogeneity of liposomes, in a manner suitable for the present invention. Ultrasonic irradiation of a modified liposome suspension either by standard bath or probe sonication produces a progressive size reduction down to small unilamellar vesicles (SUVs) between about 0.02 and 0.08 microns in size. A sonicating procedure used to produce SUVs is described in Example 1. Homogenization is another method which relies on shearing energy to fragment large liposomes into smaller ones. In a typical homogenization procedure the modified liposome suspension is recirculated through a standard emulsion homogenizer until selected liposome sizes, typically between about 0.1 and 0.5 microns are observed. In both methods, the particle size distribution can be monitored by conventional laser-beam particle size determination.

Extrusion of liposomes through a small-pore polycarbonate filter or equivalent membrane is also an effective method for reducing liposome sizes down to a relatively well-defined size distribution whose average is in the range between about 0.03 and 1 micron, depending on the pore size of the membrane. Typically, the suspension is cycled through one or two stacked membranes several times until the desired liposome size distribution is achieved. The liposome may be extruded through successively smaller pore membranes, to achieve a gradual reduction in liposome size.

Centrifugation and molecular sieve chromatography are other methods which are available for producing a liposome suspension with particle sizes below a selected threshold less than 1 micron. These two respective methods involve preferential removal of large liposomes, rather than conversion of large particles to smaller ones. Liposome yields are correspondingly reduced.

The size-processed liposome suspension may be readily sterilized by passage through a sterilizing membrane having a particle discrimination size of about 0.2 microns, such as a conventional 0.22 micron depth membrane filter. If desired, the liposome suspension can be lyophilized for storage and reconstituted shortly before use.

As previously noted, the modified liposomes can be utilized with any of the enhanced recovery techniques. If utilized in the primary recovery where waterflooding is also utilized it can be incorporated into the waterflood. In cases in which brine solutions and even highly concentrated brine solutions are to be utilized, the modified liposome of the present invention can be utilized either alone or as part of any conventional surfactant system, whether it be a carboxylate surfactant system of one utilizing lyotropic liquid crystals of any type. Such surfactant systems often contain chlorinated hydrocarbons and/or alcohols, polyethoxylated alcohols, alkyl phenols or other alkylaryl compounds. A common dual surfactant system is described in U.S. Pat. No. 3,811,505 in which an ionic surfactant as an alkyl or an alkylaryl sulphonate is used together with a nonionic surfactant such as a polyethoxylated alkyl phenol or polyethoxylated aliphatic alcohol. Another dual system is described in U.S. Pat. No. 3,811,507 utilizing again an ionic surfactant such as a sulphonate and a sulphated polyethoxylated aliphatic alcohol. A three-component surfactant system is described in U.S. Pat. No. 3,811,504 which includes an anionic surfactant and sulphated polyethoxylated aliphatic alcohol, and a nonionic surfactant. While generally satisfactory, such are not effective when used for enhanced oil recovery with a high salinity flood and/or high calcium and magnesium water and in formations with temperature greater than 70° F.

It has been found that these surfactants can be replaced, in whole or in part, by modified liposome composition of the present invention, either alone or in combinations with conventional chlorinated hydrocarbons or alcohols that have been employed in underground oil-containing formations. It has been found that the modified phosphatides of the present invention are stable not only in high concentrations of saline but also are effective even in hard water; that is, those containing large amounts of a polyvalent metal such as calcium and magnesium. Further the phosphatides of the present invention permit flooding in oil-bearing formations whose temperature ranges from 70° to about 350° F. The amount of modified liposome in the waterflood can be as low as about 0.5 and up to 100 pore volume percent. While large volumes can be used, such is uneconomical. For waterflooding the modified liposome can be utilized in any of the conventional waterflooding procedures. The liposome can be added directly to the water flood as in low tension flooding or as a slug as is done with some waterflooding techniques.

The modified liposome of the instant invention can also be used with the LPG or other gas miscible slug process. In the LPG technique a liquefied petroleum gas (LPG); such as ethane, propane, or butane, immiscible with the typical reservoir of oil and equal to about 5% of pore volume, is injected into the well and then this slug is followed by either a natural gas or gas and water which pushes the slug through the reservoir. Since LPG products are "first contact" miscible with the oil, meaning that they are miscible with the oil immediately upon contact, they will pick up the oil as a bank in front of the slug. The slug is maintained in a liquid state in order to maintain its miscibility with the oil in the underground formation by maintaining it under the pressure necessary to keep it liquid. For propane, for example, this is about 1,000 to 1,300 psi or higher at typical oil reservoir temperatures.

With the instant invention the efficiency of recovery by these methods is greatly increased. Heretofore there were unsatisfactory area sweep efficiencies and a correspondingly low overall efficiency of such process of enhanced recovery. It is believed that this is due based on the fact that it is known in oil recovery procedures that an oil displacement process is most efficient when the viscosity of the displacing fluid is equal to or greater than the viscosity of the displaced fluid. Since gas, whether LPG or any of the other gases, is used for recovery such as carbon dioxide, nitrogen, or light hydrocarbons is less viscous and more mobile than most of the crude oils in the reservoirs, they are not efficient oil displacement agents. By adding modified liposomes of the present invention to the gas-water flood recovery, the process is greatly improved. It has also been noted that the amount of gas need to obtain high oil recovery is also decreased inasmuch as the presence of the modified liposome causes the gas to be confined to the zone of interest and prohibits the gas from channeling through high permeability strata and thereby becoming lost or unavailable for oil recovery. The modified liposomes can be introduced either in the gas slug or directly into the reservoir by means of a water or oil/water vehicle prior to, during, or even after as alternative slugs of water and gas injection are made into the well. The amount of liposome used will vary dependent upon the formation dynamics discussed and the optimum amount can be determined by routine experimentation.

As noted, in addition to the LPG procedure, the use of carbon dioxide (as disclosed, for example, in U.S. Pat. No. 2,623,596 or U.S. Pat. No. 3,065,790) can be utilized for this miscible slug process. More properly, such process, to distinguish it from LPG, is called the "carbon dioxide miscible process". A modification of it using a lean gas, a process developed by Atlantic Richfield Company, is referred to as the "high pressure lean gas miscible process".

Flooding techniques in which micelle solutions are utilized are now commonly accepted tertiary recovery procedures. Micellar flooding utilizes micellar solutions in slugs followed by driving water in order to recover the oil. Such micellar solutions conventionally are a combination of a surfactant, a hydrocarbon, an electrolyte in order to adjust the viscosity of the solution, and often a co-surfactant. This process is utilized in a conventional flooding technique. That is, a slug of the micellar solution is formed in the reservoir by injecting a volume of such micellar solution into the formation. The slug moves through the formation displacing all of the oil and water ahead of it toward the producing well. Conventionally, the micellar slug is followed by a polymer slug or bank of thickened water for mobility control and after sufficient polymer is injected, drive water is used as in any conventional water flooding procedure. With the present invention it has been found that increased recovery is obtained if, in place of the conventional surfactants used in such micellar material, a modified liposome of the present invention is utilized. Again, the optimum amount used is determined by routine experimentation.

The present invention is also applicable to thermal recovery procedures employing injection of hot fluids into the reservoir itself. Thermal recovery by hot fluid injection utilizes either a hot water flood, cyclic steam injection, or steam drive. Any of these procedures can be utilized and more efficient recovery obtained if there is included a modified liposome of the present invention in an amount sufficient to enhance recovery.

The single figure of the drawing illustrates the zone in which the modified liposomes can be utilized in surfactant flooding when considering a combination of salinity and temperature. This operational zone is not possible with present surfactants. At lower salinities (below 4 percent Total Dissolved Solids), sulfonates can be used over a wide range of temperatures. As used here, "sulfonates" refer to petroleum and synthetic surfactants, both of which are available commercially today. At lower temperatures and higher salinities, oxyalkylated sulfates and sulfonates can be used, most often in combination with petroleum sulfonates. However, sulfonates begin to have stability problems at temperatures above 120° F. While they can be applied in typical field projects up to 150° F., the amount of sulfate used must be increased to compensate for loss from hydrolysis. Surfactants are not available for use under high-salinity, high-temperature conditions. Note however that the modified liposomes can be used in the very areas surfactants are not operative.

The present invention will be further described in connection with the following examples which are set forth for purposes of illustration only.

EXAMPLE 1

Salinity scans, stability, (NaCl and CaCl$_2$) of a number of modified liposomes were conducted by mixing small volumes of the liposomes at the specified concentration of salinity. Observations of any instability, formation of a precipitate, film, etc., were made at 24 hours. The results of a scan are shown in Table I.

TABLE I

| Sample | Maximum salinity Tolerance Concentration % | NaCl % | Ca + 2 (ppm) |
|---|---|---|---|
| G-2 | 1 | 15 | 500 |
|  | 5 | 15 |  |
| G-4 | 1 | 32 |  |
|  | 5 | 32 |  |
| G-10 | 1 | 15 | 5000 |
|  | 5 | 15 | 50000 |

Preparation of sampler G-2, G-4, and G-10 is described in Examples 4 to 19.

EXAMPLE 2

Interfacial tension measurements (IFT) were conducted on Thermostated University of Texas Spinning Drop Tensionmeter. The results of a number of these tests are shown in Table II.

TABLE II

Minimum Interfacial Tension Results

| Sample No. | Conc. % | Prep. Method | IFT Millidyne/cm | Oil | NaCl % | Isopropyl Alcohol % | Temp. C. | Size Micron |
|---|---|---|---|---|---|---|---|---|
| G-1 | 2.5 | A | 16000 | C8 | 0.5 | NONE | 22 | NM |
| G-1 | 2.5 | A | 8700 | C16 | 0.5 | NONE | 22 | NM |
| G-1 | 2.5 | A | 12000 | C8 | 0.5 | IPA (5%) | 22 | NM |
| G-1 | 2.5 | A | 606 | C16 | 0.5 | IPA (5%) | 22 | NM |
| G-2 | 2.5 | A | 612 | C8 | 0.5 | NONE | 22 | NM |
| G-2 | 2.5 | A | 272 | C16 | 0.5 | NONE | 22 | NM |
| G-2 | 2.5 | A | 614 | C8 | 0.5 | IPA (15%) | 22 | NM |
| G-2 | 2.5 | A | 195 | C16 | 0.5 | IPA (5%) | 22 | NM |
| G-4 | 1.0 | A | >200 | C16 | 22.0 | NONE | 22 | >8 |
| G-4 | 1.0 | A | >100 | C16 | 22.0 | NONE | 60 | >8 |
| G-4** | 1.0 | B | <1 | C16 | 15–22 | NONE | 60 | <1.2 |
| G-4 | 1.0 | B | 200 | C16 | 15 | NONE | 60 | <1.2 |
| G-10** | 0.5 | C | 3 | C16 | 12.7 | IPA (10%) | 60 | <0.1 |
| G-10 | 0.5 | B | 667 | C16 | 15 | NONE | 22 | NM |
| G-10** | 0.5 | B | 16 | C16 | 15 | NONE | 60 | <0.1 |
| G-10 | 0.5 | C | 214 | C16 | 15 | NONE | 22 | <0.1 |
| G-10 | 0.5 | C | 214 | C16 | 15 | NONE | 22 | <0.1 |
| G-11 | 0.05 | C | 5600 | C8 | 13 | NONE | 60 | <0.1 |
| G-12 | 0.05 | C | 524 | C8 | 13 | NONE | 60 | <0.1 |
| G-13A | 0.5 | C | 168 | C16 | 15 | NONE | 60 | <0.1 |
|  | 0.25 | C | 1390 | C16 | 15 | NONE | 60 | <0.1 |
| G-13O** | 0.5 | C | 3 | C16 | 15 | NONE | 60 | <0.1 |
|  | 0.25 | C | 57 | C16 | 15 | NONE | 60 | <0.1 |
|  | 0.125 | C | 42 | C16 | 15 | NONE | 60 | <0.1 |
|  | 0.0625 | C | 1000 | C16 | 15 | NONE | 60 | <0.1 |
| G-14 | * | D | 4500 | C16 | 15 | NONE | 60 | <0.1 |
| G-17 | * | D | 1753 | C16 | 15 | NONE | 60 | <0.1 |
| G-18** | * | D | 3.2 | C16 | 15 | NONE | 60 | <0.1 |
| G-19 | * | D | 1686 | C16 | 15 | NONE | 60 | <0.1 |
| G-21 | * | D | 1251 | C16 | 15 | NONE | 60 | <0.1 |
| G-22 | * | D | 4200 | C16 | 15 | NONE | 60 | <0.1 |

Method of preparation:
A - Shaken or stirred with magnetic stirrer.
B - Sonicated in 5% to 15% NaCl.
C - Precipitated from an isopropyl alcohol solution in water with agitation.
D - Soybean phosphatide fractions separated by chromatograph on silicic acid column.
*Mole concentration in a drop of oil.
**Low IFT suitable for oil recovery
The preparation of the samples is described in Examples 4 to 19.

EXAMPLE 3

The following procedure was used in preparing waterwet Barea sandstone cores used for flooding according to the present invention. Barea cores, 10 inches long and 1.5 inches in diameter were fired at 800° F. for 24 hours. The cores were cooled and weighed to determine the dry weight before saturation with brine of the desired concentration. The cores were placed in an evacuation chamber and a vacuum of about 1 mm was pulled on the core for 2 hours. The core was saturated under partial vacuum with degassed brine and allowed to remain under vacuum for about one hour. The core was removed from the evacuation chamber and weighed to determine saturated core weight. The pore volume of the core was calculated by the relationship: brine saturated core weight (g) - dry core weight (g), divided by the density of the brine (g/ml) equals the core volume (ml). The core was then mounted wet in Hassler sleeve and brine (about 2 pore volume) was pumped through the core before determining the original permeability to brine. The Hassler is thermostatically heated to stimulate reservoir temperature.

The brine-saturated core was oil flooded at about 30 ft/day to remove all the displaceable brine. The oil-flood was carried out using a recycling oil system and required about 24 hours. The total brine displaced by the oil saturation was used to calculate initial oil saturation (Soi). Optionally, oil permeability was determined in a manner analogous to that used above for establishing original permeability to brine. Prior to waterflood, the core effluent line was air blown to remove oil.

The oil-flooded core was waterflooded at 3 to 5 feet per day, until the effluent brine/oil ratio is greater than 99:1. The total oil displaced is measured and Sow (oil saturation at the end of the waterflood) is calculated. The residual oil volume remaining in the core is calculated by subtracting the volume displaced by the waterflood from the water volume displaced by the oil flood. If desired, water permeability after waterflood can be determined in a manner analogous to that used above for original permeability to brine. Cores were routinely conditioned in this manner prior to carrying out the flooding tests. At this point, the core simulated an oil reservoir that had been exhaustively waterflooded.

The slug containing the modified liposome is injected at a slower rate, corresponding to field flow rate of either 1.5 or 1 foot/day as stated for the pore volume specified. The slug may optionally contain a mobility buffer or be followed by a mobility buffer. Oil recovery from the core is measured to determine Soc (final oil saturation after chemical flooding). Oil recovery efficiency of the chemical flooding (Re) is calculated as (Sow-Soc/Soc)×100.

The following are the examples of displacement experiments which demonstrate the feasibility of the present method.

A. A coreflood (GH-3) at 60° C., using hexadecane as the oil and 15 wt/vol % NaCl as the brine was prepared as above and waterflooded to residual oil saturation. A displacement experiment conducted at 1.5 ft/d used a formulation (2.2 pore volume slug) of 0.5% G-4 in 15% NaCl. G-4 was sonicated to produce a dispersion that would easily filter through 0.2 micron filter paper. The IFT at ambient was 0.041 dyne/cm and less then 0.001 dyne/cm at 60° C. The injected formulation had a viscosity of 1.1 cp. A mobility buffer (1.47 pore volume) of FLOCON 4800 biopolymer having a viscosity of 11.2 cp. was injected to displace the liposome. An additional polymer slug containing 3% IPA and FLOCON 4800 was then injected for one pore volume in an attempt to displace the liposome. A summary of the coreflood and oil/water ratio is presented below.

| Core | Soi | Sow | Soc | Re |
| --- | --- | --- | --- | --- |
| GH-3 | 66.2 | 27.2 | 24.4 | 10.3 |

Figure 2:
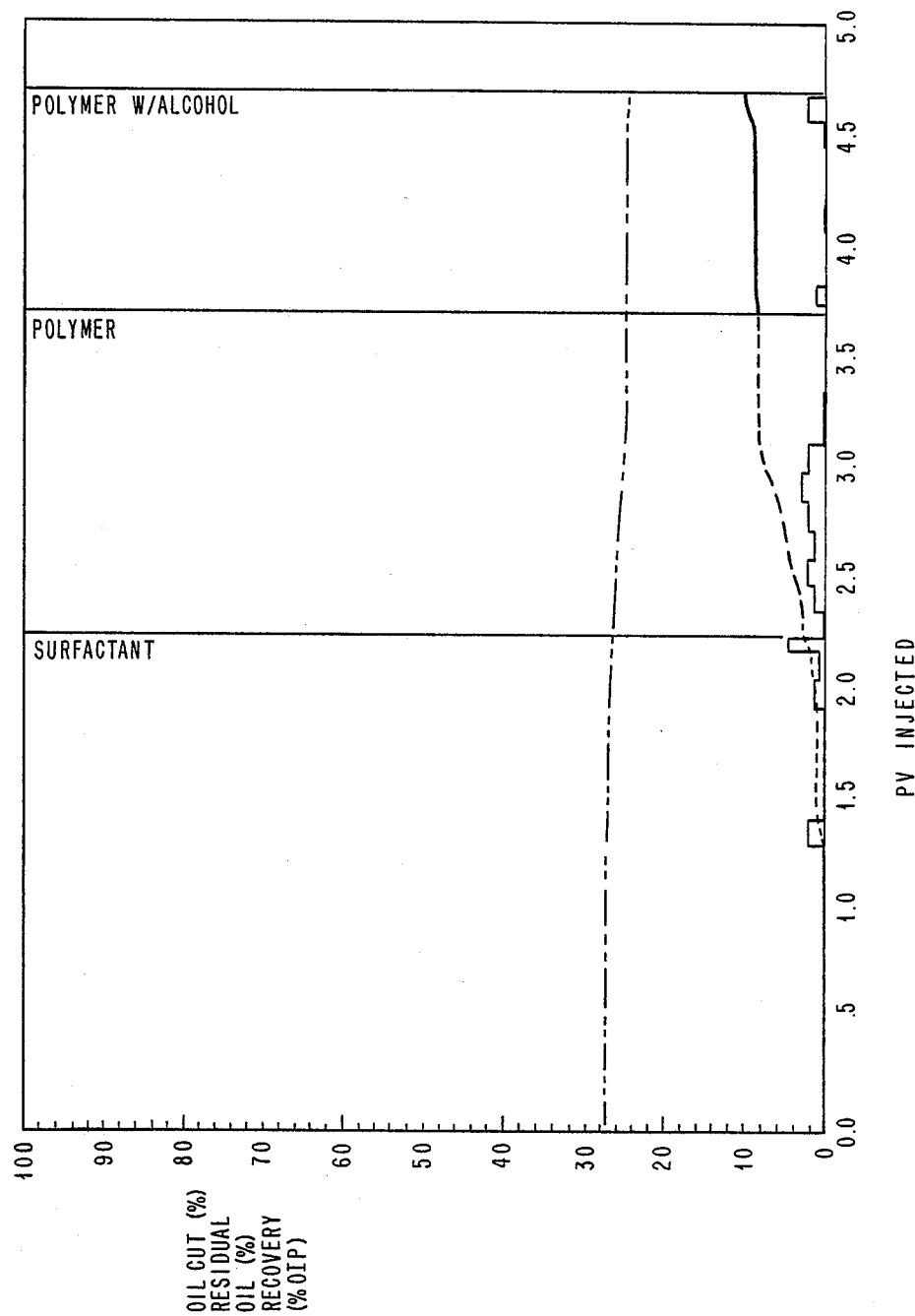
FIG. 2 is a graph of the coreflood results of Example 3A.

FIG. 2 shows the coreflood results.

B. A coreflood (GH-5) at 60° C., using hexadecane as the oil and 15 wt/vol % NaCl as the brine was prepared as above and waterflooded to residual oil saturation. The displacement experiment conducted at one ft/d shows the effect of a number of methods of liposome preparation. A liposome formulation (1.1. pore volume slug) corresponding to 0.5% G-10 in 15% NaCl was prepared so that the dispersion would easily filter through 0.22 micron filter paper. The IFT at ambient was 0.667 dyne/cm and 0.0048 at 60° C. and the formulation had a viscosity of 1.1 cp. A second liposome slug prepared by sonication of G-10 was injected (0.7 pore volume, 0.5% G-10 in 15% NaCl). This sonicated material filtered through a 0.22 micron filter but plugged a 0.1 micron filter after ca. 15 ml. A third slug (one pore volume) of the sonicated G-10 was viscosified with FLOCON 4800 biopolymer such that the viscosity of the resulting slug is 4.5 cp. at 60° C. The resulting IFT of the viscosified liposome slug was higher, 0.0184 dyne/cm at 60° C. A fourth slug containing just FLOCON 4800 was then injected for 0.7 pore volume. A summary of the coreflood and the oil/water ratio is presented below.

| Core | Soi | Sow | Soc | Re |
| --- | --- | --- | --- | --- |
| GH-5 | 66.77 | 34.45 | 26.01 | 24.49 |

Figure 3:
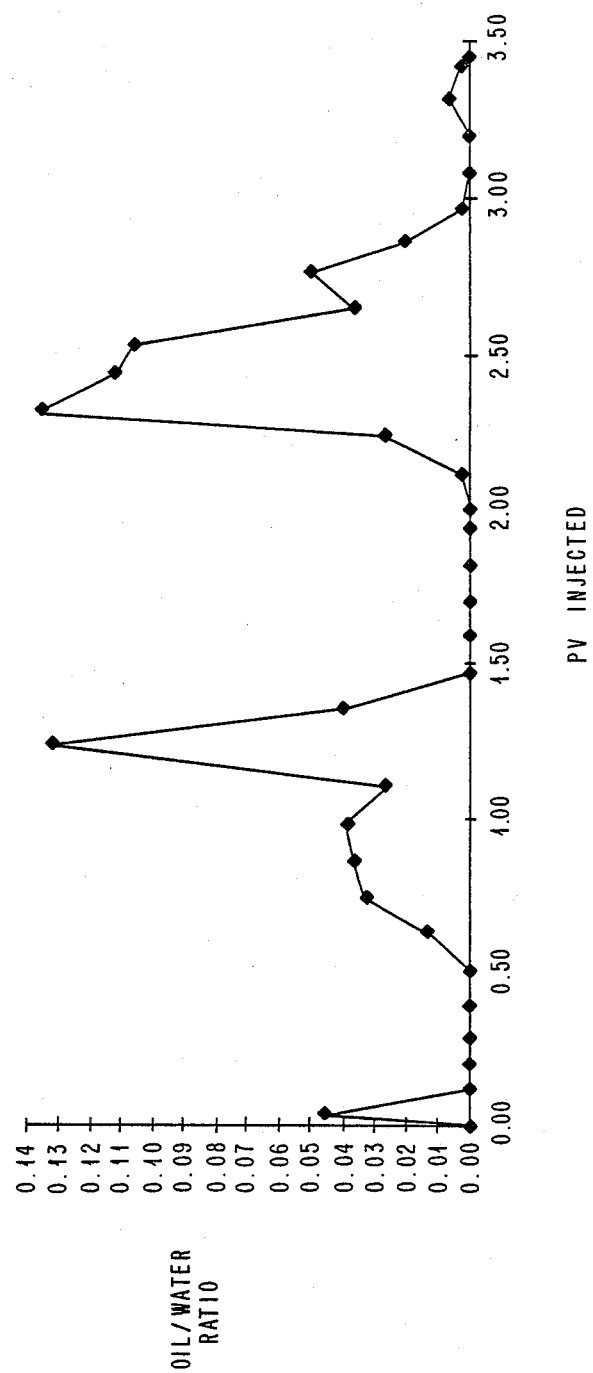
FIG. 3 is a graph of the coreflood results of Example 3B.

FIG. 3 shows the coreflood results.

EXAMPLE 4

400 g of crude soybean phosphatides were dissolved in 600 ml of chloroform and 1,200 ml of methanol were added, with stirring. A precipitate formed and settled to the bottom of the flask. The supernatant was decanted and the sediment washed with 300 ml of methanol. The combined solvents were evaporated in vacuo. Yield of purified phosphatides (G-4); about 300 g.

EXAMPLE 5

500 g of crude soybean phosphatides were stirred vigorously with two liters of acetone. A precipitate formed and settled to the bottom of the flask. The supernatant was decanted and the sediment further washed with 1/1 of acetone. The precipitate was dissolved in 600 ml of chloroform and 1,200 ml of methanol was added. The precipitate which formed was washed twice successively with 300 ml each of methanol. The combined solvents were evaporated in vacuo. Yield of purified phosphatides (G-2); about 200 g.

EXAMPLE 6

500 g of crude phosphatides were stirred vigorously with 2/1 of acetone. A precipitate formed. The supernatant was removed and the precipitate washed with 1/1 of acetone. After decanting, the precipitate was dried in vacuo. The yield of these deoiled phosphatides (G-5); about 350 g.

EXAMPLE 7

The partially purified phosphatides (as per Example 5) were dissolved in a suitable solvent (e.g. dichloromethane; chloroform or ethanol) and filtered through a column of dry alumina (aluminum oxide for column chromatography) or, alternatively, through a mixture of alumina and silica. The solvent was evaporated in vacuo, yielding (G-10).

EXAMPLE 8

5 g PC (as per Example 7) were dissolved in 350 ml of diethyl ether. Five hundred mg of phosphiliphase A2 (of Crotalus admanteus or other similar snake venom) was added, followed by 90 ml of 5 mM $CaCl_2$ and 1 ml of concentrated ammonium hydroxide. After stirring for several hours at room temperature, the ether was evaporated in a stream of nitrogen or air and the water in vacuo. The residue was dissolved in a mixture of chloroform and methanol, 9:1, and applied to a column of alumina. Increasing concentrations of methanol in chloroform were applied and the fractions tested for presence of lysophospholipid using thin layer chromatography plates (eluent chloroform-methanol-$H_2O$, 60:35:4, by volume). Most of the lysolecithin (G-11) was eluted in a mixture of 70–80% of methanol and 20–30% chloroform.

EXAMPLE 9

25 g of crude soybean phosphatides were treated with 200 ml of acetone; after decanting the supernatant, the sediment was again treated with 50 ml acetone. The residue was dried in vacuo and dissolved in 45 ml of chloroform, 30 ml of which were applied to a column of silicic acid (Merck 60) and eluted with 200 ml each of the following mixtures of chloroform and methanol (by volume). 100:0; 90:10; 90:10; 80:20; 70:30; 60:40; 50:50; 40:60; 30:70: 20:80. This was followed by two fractions of 200 ml each methanol. Each fraction (G-13 to G-22) was evaporated under nitrogen and a portion applied to thin layer plates of silica gel.

EXAMPLE 10

3 ml of the chloroform solution of the deoiled crude soybean phosphatides (as per Example 5) were evaporated under nitrogen, 5 ml of 0.4 N KOH in 90% methanol were added and the solution heated for two hours at 45° C. 5 ml of chloroform and 5 ml of water were added and, after stirring on a cylcomixer, the phases were separated. The lower chloroform-rich phase was chromatographed on this layer plates of silica gel and the respective plates sprayed with ninhydrin and phosphorous sprays. This provided alkali resistant compounds present in the hydrolyzed esterified crude soybean phosphatides.

EXAMPLE 11

1.5 g of purified soybean phosphatidylcholine (PC) was dissolved in chloroform methanol. Glass beads were added, the solvent was removed in vacuo and the residue dried in high vacuum for about 2 hours. The dried residue was covered with about 300 ml of 13% NaCl and the mixture shaken for 1 hour at 37° C. resulting in multicellular liposomes of soybean PC.

EXAMPLE 12

1.5 g of purified soybean PC was dispersed in 25 ml diethylether and 25 ml of 13% NaCl. After subjecting to sonic vibrations (in a sonic bath) for 20 minutes, the mixture was shaken for 30–60 minutes at 4° C. and the ether evaporated under a steam of $N_2$ and then in vacuo. The final dispersion of stable plurolamellar vesicles (SPLV) was diluted with water or 13% NaCl to a final volume of 300 ml.

EXAMPLE 13

The stable plurolamellar vesicles of soybean PC (SPLV) were extruded through a 0.1 M polycarbonate filter using a pressure of 50–100 psi, thereby reducing the size of the SPLV.

EXAMPLE 14

1.5 g of purified soybean PC was dispersed in 300 ml of 50 mM Tris-HCl pH 7.5 containing 15 mg $FeSO_4$ and 200 mg ascorbic acid. After incubating for 90 minutes the reaction was stopped by adding EDTA to a final concentration of 2 mM. The peroxidation of the polyunsaturated fatty acyl residues of soybean PC was followed in a spectrophotometer at 232 nm.

EXAMPLE 15

Small unilamellar vesciles (SUV) of purified soybean phosphatidylcholine were prepared in 13% NaCl. The diameter of the vesicles was determined by turbidity measured as absorption at 330 n. After 6 months at 4C it was again checked and found to have increased in size by less than 20%.

EXAMPLE 16

SUV of purified phosphatidylcholine were prepared in 13% NaCl an stored at 4° C. When $CaCl_2$ (0.5–5%) was added to the vesicular dispersion, no visible changes in the apparent size of the dispersion were observed.

EXAMPLE 17

One g of ground Brea stone was wetted with 2 ml of 13% NaCl and stirred with 8 ml of 0.5% purified soybean PC in 13% NaCl. After 15 minutes, the stirring was stopped and; once the powdered stone settled down, a sample was removed for phosphorus determination. The residual dispersion then remained in contact with the powder for seven more days at room temperature. At the following intervals: 3.5h; 24h; 2d; 3d; 4d; 5d; 6d; and 7d. The mixture was stirred for several minutes and once the mixture settled down samples were taken for phospholipid phosphorus determination. About 30–35% of the PC was adsorbed onto the powdered stone in the initial 15 minutes and but little more adsorption occurred in the following seven days.

EXAMPLE 18

10 g of purified soybean phosphatidylcholine (PC) was dissolved in 200 ml of isopropyalcohol (IPA) and 400 ml water were added. The mixture was heated until fully clear. Should some opacity occur, a few drops of isopropyl alcohol (IPA) were added until the solution became fully clear. This PC solution was then added, dropwise to 1,400 ml $H_2O$ or salt solution (e.g., 18% NaCl) with rapid stirring. Small unilamellar vesicles formed immediately. The dispersion was extremely stable and could be stored at room temperature or 4° C. for a year without apparent change in the size of the vesicles. The residual IPA (10%) could be removed by dialyzing against water or salt solution. To prevent growth of microorganism, sodium azide (0.1% w/v) was added as a preservative. The dispersion whose vesicles have a diameter of about 0.5 m could be filtered through polycarbonate filter with a pore size of 0.2 mM and was stable to storage for at least 12 months in room temperature. It was not precipitated by 0/5–5% NaCl.

EXAMPLE 19

SUV of soybean PC were prepared as per Example 18. The IPA were removed by dyalysis against 13% NaCl and the vesicular dispersion was stored at 4° C. When heated at about 50° C., or more, the dispersion became strongly opaque but when cooled to room temperature or when placed in ice water, the opacity disappeared and there was a full reversal to the slightly opalescent state of the small vesicles.

From the foregoing examples it is seen that the modified liposomes of the present invention give the low interfacial tension necessary for good enhanced oil recovery, require no co-solvents, and suffer no chromatographic separation even under conditions of high salinity, high temperatures, and/or hard water.

Also, the present invention is not limited to recovery of oils such as light or heavy oils, but also to tars and as such the term "petroleum" is used herein as a generic term to denote such oils and tars.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of recovering a petroleum from an underground source thereof comprising injecting into said underground source a petroleum displacement agent comprising a fluid and a modified liposome, said liposome being present in an amount sufficient to lower the interfacial tension between said fluid and said petroleum to below about 10 millidynes.

2. The method of claim 1 wherein said fluid is water or a gas.

3. The method of claim 2 wherein there is about 0.5 to 100 parts by weight of modified liposome for each 100 parts by weight of fluid.

4. The method of claim 3 wherein the liposome is selected from phospholipid vesicles in which at least one acyl group has been replaced by a complex phosphoric acid ester.

5. The method of claim 4 in which the phospholipid is a lecithin.

6. The method of any one of claims 1 to 5 wherein a surfactant conventionally used for petroleum recovery is included in said displacement agent.

* * * * *